United States Patent [19]
LeVan et al.

[11] Patent Number: 6,106,736
[45] Date of Patent: Aug. 22, 2000

[54] PLANARIZATION PROCESS AND APPARATUS FOR THE ETCH DEFINITION OF MAGNETIC HEAD AIR BEARING SURFACES

[75] Inventors: Dien LeVan; Robert Dennis Miller; Adel Issa Nazzal; Andrew Chiuyan Ting, all of San Jose, Calif.

[73] Assignee: International Business Machines Corporation, Armonk, N.Y.

[21] Appl. No.: 08/923,791

[22] Filed: Sep. 4, 1997

[51] Int. Cl.⁷ ........................................................ B44C 1/22
[52] U.S. Cl. ........................... 216/22; 29/603.07; 216/33; 216/38
[58] Field of Search .................................. 216/22, 38, 41, 216/49, 33, 48, 52, 66, 36; 29/603.07; 427/532

[56] References Cited

U.S. PATENT DOCUMENTS

| | | |
|---|---|---|
| 2,743,507 | 5/1956 | Kornei . |
| 2,769,866 | 11/1956 | Kornei . |
| 2,921,143 | 1/1960 | Selsted et al. . |
| 3,963,489 | 6/1976 | Cho . |
| 4,023,997 | 5/1977 | Wanesky . |
| 4,564,585 | 1/1986 | Blaske et al. . |
| 4,624,048 | 11/1986 | Hinkel et al. . |
| 4,857,093 | 8/1989 | Prewo et al. . |
| 5,472,566 | 12/1995 | Swann et al. . |
| 5,516,430 | 5/1996 | Hussinger . |
| 5,516,704 | 5/1996 | Yoshida . |
| 5,548,886 | 8/1996 | Kojima et al. . |
| 5,566,076 | 10/1996 | Syouji et al. . |
| 5,578,319 | 11/1996 | Noel . |
| 5,613,293 | 3/1997 | Slade et al. . |
| 5,617,273 | 4/1997 | Carr et al. . |
| 5,690,839 | 11/1997 | Min . |

OTHER PUBLICATIONS

Chapman, E.B. et al., "Rotating Work Holder," *IBM Technical Disclosure Bulletin*, vol. 4, No. 8, p. 9 (Jan. 1962).

*Primary Examiner*—Frankie L. Stinson
*Attorney, Agent, or Firm*—Altera Law Group, LLC

[57] ABSTRACT

A method of processing an assembly to prepare the assembly for etch patterning, the assembly including a row or bar mounted on a substrate, the row or bar bordered by a recess, the method including placing the assembly within a frame; applying a contiguous adhesive film across said assembly and said frame; depositing a fluid in said frame, said fluid forming in said recess; and removing said contiguous adhesive film.

28 Claims, 4 Drawing Sheets

PLANARIZATION PROCESS AND APPARATUS FOR THE ETCH DEFINITION OF MAGNETIC HEAD AIR BEARING SURFACES

FIELD OF THE INVENTION

The invention relates generally to methods and apparatus for preparing planar row assemblies for etch patterning. More specifically, the invention relates to methods and apparatus for preparing transducer laden row or bar substrates for etch patterning to form the air bearing surface of a slider.

BACKGROUND OF THE INVENTION

Conventional magnetic disk drives are information storage devices which utilize at least one rotatable magnetic media disk with concentric data tracks, a read/write transducer for reading and writing data on the various tracks, an air bearing slider for holding the transducer adjacent to the track generally in a flying mode above the media, a suspension for resiliently holding the slider and the transducer over the data tracks, and a positioning actuator connected to the suspension for moving the transducer across the media to the desired data track and maintaining the transducer over the data track during a read or a write operation.

The recording density of a magnetic disk drive is limited by the distance between a transducer and the magnetic media. One goal of air bearing slider design is to "fly" a slider as closely as possible to a magnetic medium while avoiding physical impact with the medium. Smaller spacings, or "fly heights", are desired so that the transducer can distinguish between the magnetic fields emanating from closely spaced regions on the disk.

In addition to achieving a small average spacing between the disk and the transducer, it is also critical that a slider fly at a relatively constant height. The large variety of conditions that transducers experience during normal operation of a disk drive can make constancy of fly height anything but a given. If the flying height is not constant, the data transfer between the transducer and the recording medium may be adversely affected.

The manner in which a slider is manufactured and the material the slider is fabricated from can affect fly height. Preferably variations in the physical characteristics of the slider, e.g. due to manufacturing tolerance, should not substantially alter the flying height of the slider. If this result is not achieved, the slider's nominal fly height must be increased to compensate for variations between sliders.

The current process for defining air bearing surfaces on sliders uses a thick dry-resist as the etch mask. Two etch steps are generally required. The etchings include an ion-milling step for a submicron etch and a reactive ion etch (RIE) step for a deeper etch. At certain row spacings the ion milling etch results in redeposited materials being formed on the sides of the rows which cannot be removed. In addition, the etch profiles obtained after ion milling and RIE steps have shallow wall profiles which make fine feature definition difficult and affect the flying characteristics of the slider.

Exemplary processes used in forming sliders include, Hinkel, et al., U.S. Pat. No. 4,624,048 which discloses a method for making magnetic head sliders using a mask that leaves the area of the substrate surface intended for forming the rails uncovered. Hinkel, et al. uses chemical wet etching to define the recessed regions between respective rails using oxide formed on the surface of the aluminum in the exposed regions as an etch mask.

Carr, et al., U.S. Pat. No. 5,617,273 discloses formation of a row slider having a protruding read-write element formed by chemical-mechanical polishing. Carr, et al. uses a lapping slurry to erode the substrate and insulator at a rate which is different than the rate of erosion for the read/write component. The resulting read write components protrude from the insulator. Slade, et al., U.S. Pat. No. 5,613,293 also discloses a method for providing a smooth topographical interface between head and disk surfaces through the use of photo-resistant etching processes.

Kojima, et al., U.S. Pat. No. 5,548,886 also discloses a method for manufacturing floating magnetic head devices. The process includes forming a resist mask having a predetermined slider surface shaped onto a substrate and injection of a solid/gas two-phase current of free abrasive grains through an injection nozzle.

Kemp, U.S. Pat. No. 5,516,704 also discloses a method for manufacturing magnetic head air bearing sliders by forming transverse pressure contours on the edges of the slider air bearing surface. Kemp forms these contours by first forming slots in the slider blank adjacent the location where the air bearing surfaces are to be formed. The slots are then filled with etchable material and the slider blank is machined to form air bearing structures. The etchable material is positioned to form a part of the slide edge of the air bearing structure. The slider blank is then subjected to an etching process that principally etches the etchable material.

Hussinger, U.S. Pat. No. 5,516,430 discloses a planarization procedure which uses an alignment fixture on which the rows are temporarily fixed with pins. A filled thermo-plastic material is then placed on the rows with a substrate on top. The substrate is heated to 400–500° F. causing the encapsulant to melt and flow into the gaps between rows. The heating process is controlled by maintaining the alignment fixture near ambient temperature to avoid encapsulant sticking to the fixture sufficient heat is applied to melt the material near the air bearing surface (ABS).

The potential for seepage of material onto the air bearing surface on the slider is a concern using the Hussinger process. The presence of tapers at the leading edge of the slider provide a conduit by which the material can reach the ABS surface. Contamination of the ABS causes photoresist imaging and adhesion problems. Another problem with the Hussinger process is the presence of the pins in the alignment fixture. This feature causes holes to exist in the encapsulated carrier. The holes contribute to yield loss since sliders near holes will be subjected to redeposition during etch steps. Furthermore, the high temperature requirement for the procedure (400–500° F.) may also preclude the user of certain thermally sensitive transducers.

As a result, there is a continuing need for processes and apparatus which will provide sliders having air bearing surfaces formed by etch patterning which avoids redeposition and provides finer etch detail.

SUMMARY OF THE INVENTION

In accordance with a first aspect of the invention, there is provided a method of processing an assembly to prepare the assembly for etch patterning, the assembly comprising a row or bar mounted on a substrate, and the row or bar bordered by a recess. The method comprises the steps of placing the assembly within a frame, applying a contiguous adhesive film across the assembly and the frame, depositing a fluid in the frame, the fluid forming in the recess, and removing the contiguous adhesive film.

In accordance with a more preferred aspect of the invention, there is provided a method of preparing the air bearing surface of a slider for etch patterning. The method comprises the steps of applying a first slider to a substrate, the first slider comprising an air bearing surface, applying a second slider to the substrate, the second slider comprising an air bearing surface, the first and second sliders separated by a recess, the first and second slider air bearing surfaces being exposed, placing the substrate into a frame, applying an adhesive film across the substrate and the frame, the adhesive film being contiguous across the frame and the substrate, the adhesive film positioned adjacent the exposed first and second air bearing surfaces, depositing a heated fluid in the frame, the fluid forming in the recess, the fluid comprising candellila wax, solidifying the candellila waxes, and removing the contiguous adhesive film.

It is important for the magnetic slider to be clean and free from contaminants that may create problems during file operation. However, during ion milling processes used to define the slider ABS, it is very difficult to control material redeposition. Redeposition can cause electrical shorts and damages at the head/disk interface. To prevent this redeposition the recesses between the rows are filled with a suitable material prior to ABS definition. Preferably, the process of the invention provides complete and accurate filling of recesses, which may not be of uniform width, with an easily removable material which is compatible with carrier processes used for air bearing surface definition.

Another aspect of the invention is a method for planarization of the carrier row assembly before application of the photoresist using a frame that surrounds the carrier during tape lamination, material filling, wet resist application, photo exposure, and photo development. Because tape lamination takes place prior to material filling, complete planarization of the row-carrier assembly is achievable, and contamination of the air bearing surface due to material overfill or misfill can be prevented. Furthermore, due to the presence of the frame, edge bead formation at the ends of the rows is preventable, resulting in uniform line width control throughout the carrier. After photodevelopment, the frame is removed and the air bearing surface (ABS) definition process proceeds in the normal manner.

Another aspect of the invention is a method of preventing bubble formation during planarization. This technique uses a vacuum oven to lower the pressure in the recesses prior to melting and then dispensing the filled material into the recesses. Complete planarization may be achieved for very narrow recesses resulting in full protection of the row vertical surfaces from ion milling redeposition.

Another aspect of the invention involves the use of an organic material to fill the space between the rows in the ion milling step. This organic material protects the vertical surfaces of the row from ion milling redeposition. When later removed, the organic material leaves clean surfaces, unaffected by ion milling redeposition material.

BRIEF DESCRIPTION OF THE FIGURES

Referring now to the figures in which like reference numbers represent corresponding parts throughout.

DETAILED DESCRIPTION OF THE PREFERRED EMBODIMENT

In accordance with a preferred embodiment of the invention, there is provided a method for preparing the air bearing surface of a slider for etch patterning. A first row or bar is generally applied to a carrier with the air bearing surface (ABS) exposed. Further rows or bars may be applied to the carrier, each of the row or bars separated by a recess. Each of the rows or bars may comprise one or more air bearing surfaces which are exposed for patterning. The carrier is then placed into a frame. An adhesive film is then generally applied to the carrier and frame. A fluid is then deposited in the frame, the fluid flowing into these recesses. The fluid is held in the recesses by the adhesive film. The fluid may then be hardened and the adhesive film removed to provide a planar surface. The ABS side of the row may then be coated with an etch mask, the etch mask developed, and the air bearing surface patterned.

Figure 1:
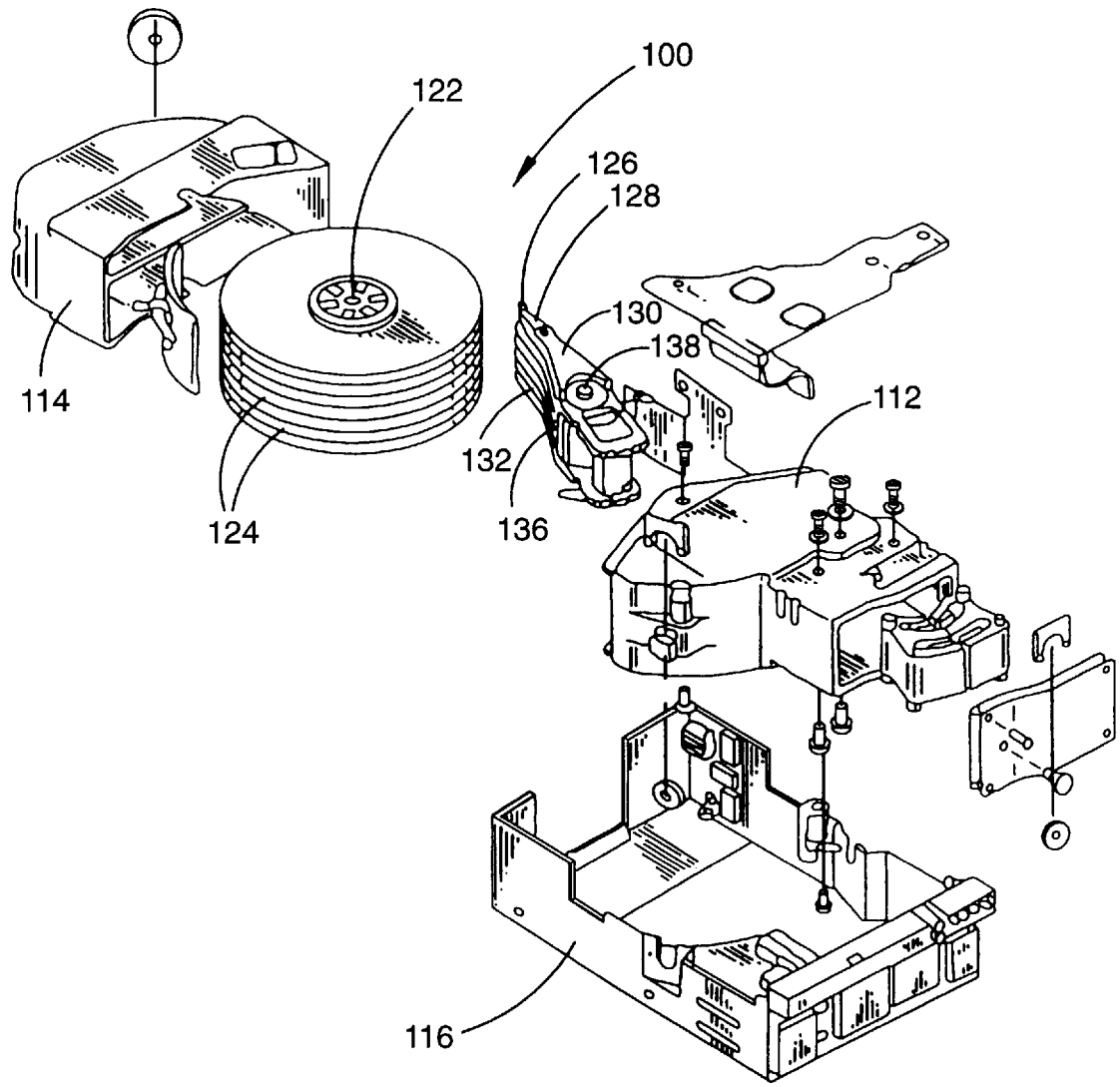
FIG. 1 is an exploded perspective view of an exemplary hard drive assemble including a slider.

Generally the method of the invention may be used to pattern any slider used in the hard drive assembly (HDA) in computing systems common in the industry. As background, an exemplary HDA may be seen in FIG. 1 which is an exploded view of a disk drive 100. The disk drive 100 includes a housing 112 and a housing cover 114 which, after assembly, is mounted within a frame 116. Mounted within the housing is a spindle shaft 122. Rotatably attached to the spindle shaft 122 are a number of disks 124. In FIG. 1, eight disks 124 are attached to the spindle shaft 122 in spaced apart relation. The disks 124 rotate on spindle shaft 122 which is powered by a motor.

Information is written on, or read from, the disks 124 by heads or magnetic transducers which are supported by sliders 126. Preferably, sliders in accordance with the invention are coupled to suspensions or load springs 128. The load springs 128 are attached to separate arms 130 on an E block or comb 132. The E block or comb 132 is attached at one end of an actuator arm assembly 136. The actuator arm assembly 136 is rotatably attached within the housing 112 on an actuator shaft 138.

Figure 2A:
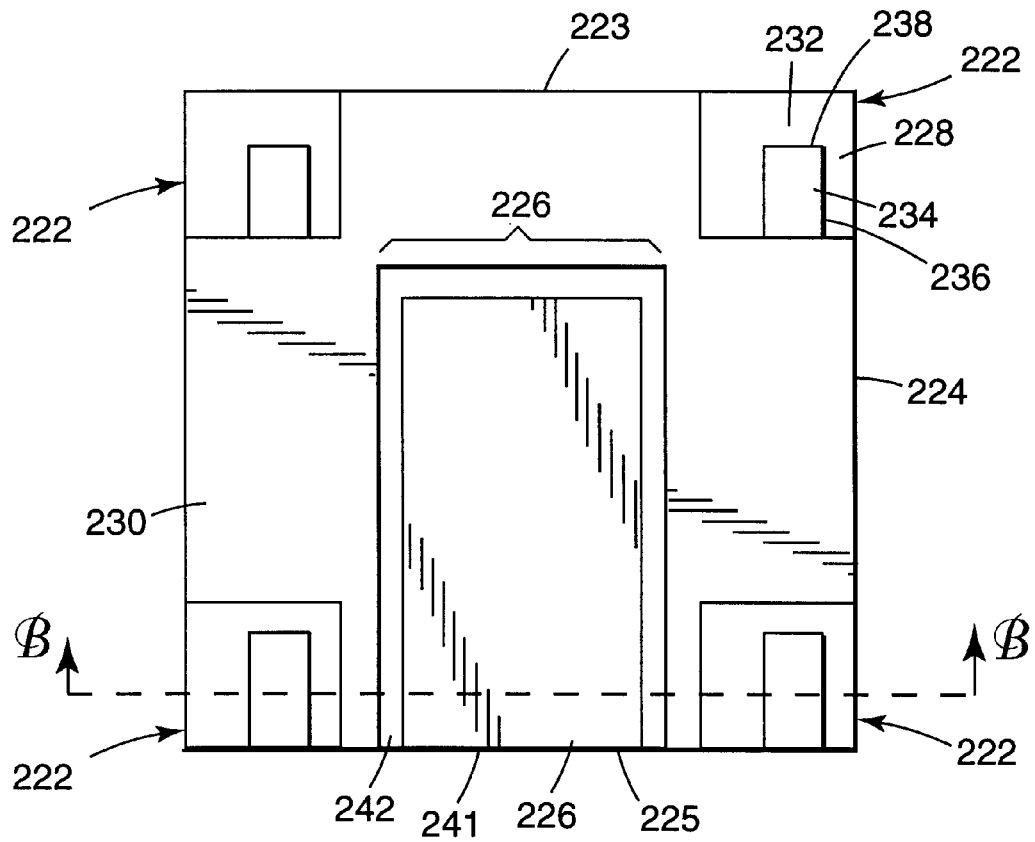
FIG. 2A is a bottom plan view of an exemplary slider.
Figure 2B:
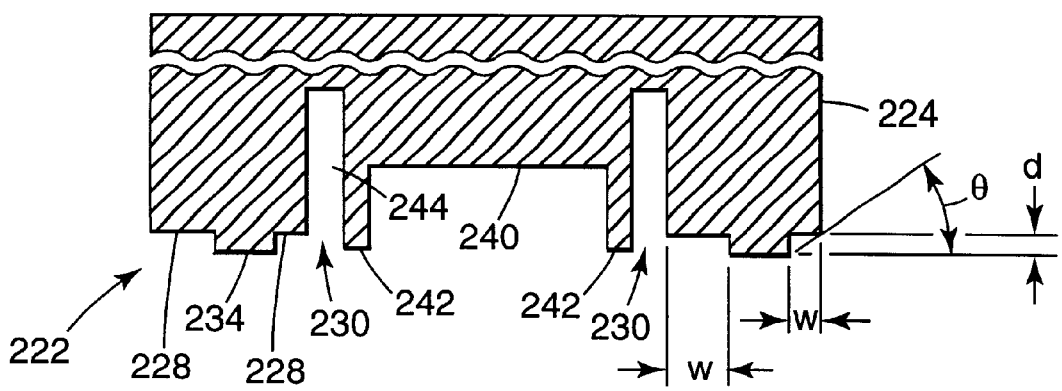
FIG. 2B is a partial cutaway view along axis B—B of the slider depicted in FIG. 2A.

To facilitate the read/write operations of the hard drive assembly, slider design can be intricate, to ensure correct and constant fly height in varying conditions. To fulfill the intended purpose of the slider, it is often patterned with various reliefs and protrusions to enhance aerodynamic character. For example, FIGS. 2A–2B illustrate a slider design 200 as disclosed in U.S. Pat. No. 5,404,256, issued Apr. 4, 1995 to James W. White, entitled "TRANSVERSE AND NEGATIVE PRESSURE CONTOUR GAS BEARING SLIDER", and which is incorporated by reference herein. The slider illustrated in FIGS. 2A–2B is designed to provide uniform and controllable fly height through a range of skew angles.

In FIGS. 2A–2B, traverse pressure contour (TPC) pads 222 are defined by a face 234 for creating a gas bearing effect, a generally U-shaped TPC section 228 including a constant depth step bearing along each side edge 236 of the face 234 and a constant depth step along the leading edge 238 forming a converging compression inlet 232. Thus, the gas bearing contour of the TPC pad 222 is defined by two parallel planes created by two different etch steps.

A negative pressure pad 226 is defined by a substantially planar surface which contains a recess 240 open at the trailing end 225. The negative pressure pad 226 may further include one or more bearing faces 242 at a height approximately that of the faces 234 of the TPC pads 222 for creating a gas bearing effect. Recess 240 is open along the trailing edge 241; that is, trailing edge 241 is substantially ambient. The ambient pressure reservoir 230 defines a cavity 244 having a depth and configuration sufficient to maintain substantial ambient pressure in the cavity during movement of the disk. Further, ambient pressure reservoir 230 includes a non-tapered (non-stepped, non-convex) inlet along leading edge 223 so as to inhibit generation of gas bearing effects created by compression of inlet gas. The process of the invention may be used to create the patterning in the air bearing surface of this slider with reduced redeposition and finer patterning.

Processing

In accordance with a preferred aspect of the invention, FIGS. 3 through 6 depict a method of preparing the air bearing surface of a slider for etch patterning. One or more rows 22 of sliders may be positioned on a substrate or carrier 12 with the air bearing surface exposed. Each of the rows 22 is generally separated by a recess 24. The carrier 12 is then placed into a frame 10 and an adhesive film is applied across the surface of the carrier and frame. The adhesive film 18 is contiguous across the surface of the frame 10 and carrier 12. A fluid which may be heated is then deposited in the frame 10. The fluid forms in the recesses 24. Preferably the fluid comprises candellila wax. The candellila wax is then solidified and the contiguous adhesive film 18 removed. The rows 22 may then be processed by conventional means including coating the rows with an etch mask, developing the etch mask, and patterning the surface of the rows.

Figure 3:
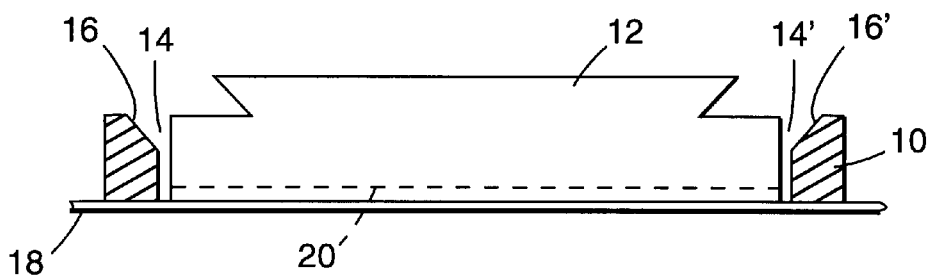
FIG. 3 is a side elevation of a carrier and frame prepared for processing in accordance with one aspect of the invention.
Figure 4:
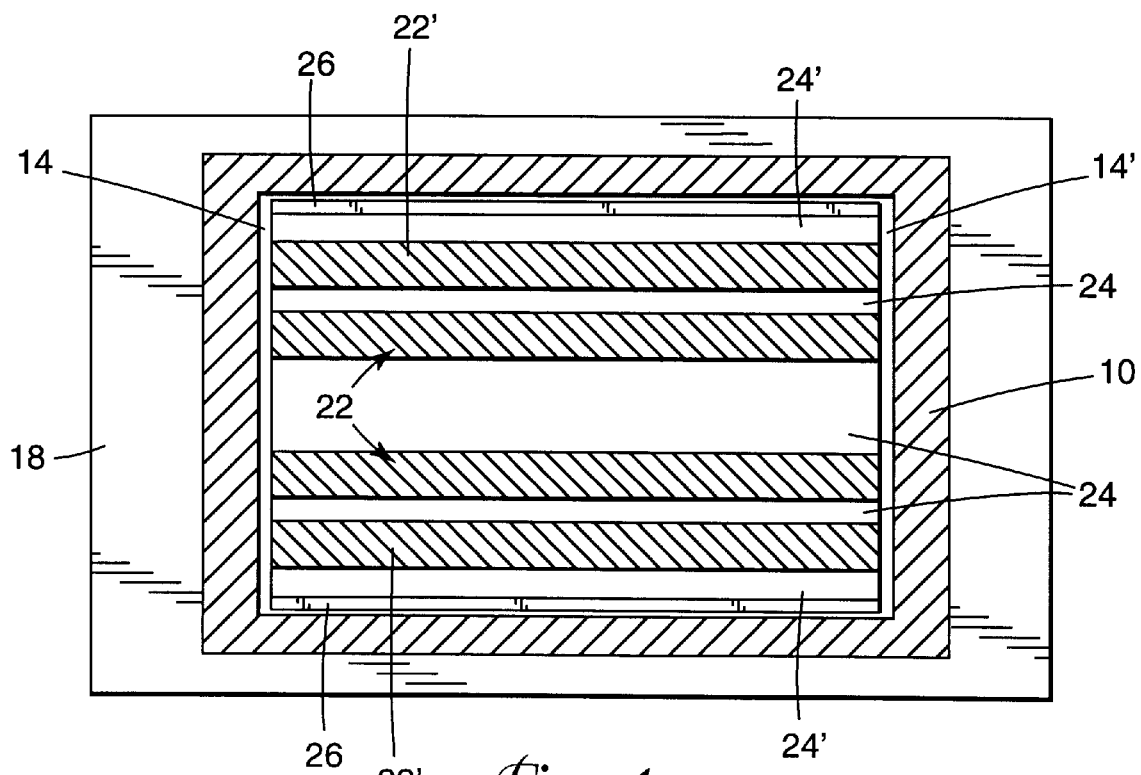
FIG. 4 is a bottom plan view of the carrier and frame depicted in FIG. 3.

Turning to the Figures, FIG. 3 shows a carrier 12 positioned within frame 10. The inner perimeter of the frame 10 is slightly larger than the carrier 12 outer perimeter. As a result, there is a space 14 and 14' between the frame 10 and the carrier 12. As shown in FIG. 3, the carrier 12 is inverted with the rows 20 and recesses (not shown) positioned adjacent the adhesive film 18. The inner wall 16 of the frame 10 may be angled sufficiently, so that when both the frame 10 and the carrier 12 are laminated to the adhesive film 18, sufficient spaces 14 and 14' (FIG. 4) are formed to allow the fluid to enter the frame 10.

An adhesive film 18 is then deposited over the frame 10 and carrier 12. As shown, the adhesive film is preferably attached to the ABS side of the carrier 12. The adhesive film functions to enclose the cavities or recesses 24 and 24' between the rows 22 and 22' which are raised in relationship to the recesses 24 and 24'. The film 18 also protects the ABS side from contamination. The film 18 may comprise any composition suitable to enclose the recesses 24 and 24' on a carrier 12 and also withstand further processing in accordance with the invention, FIG. 3.

Suitable adhesive films include tapes and resists. Resists may be used as the contiguous adhesive in accordance with the invention. These resists include T168 C or G and, Restone 1430 both made by Restone Inc. which may be applied to a thickness of about 0.25 to 0.15 millimeters through conventional processes.

Adhesive tapes are also useful as the contiguous adhesive film of the invention. Generally, the contiguous adhesive film comprises a laminate of an adhesive layer and a flexible substrate. Useful adhesives include pressure sensitive adhesives such as acrylics, natural rubbers, butyl rubbers, polyvinyl ethers, silicones and mixtures thereof. The adhesive film is generally applied at temperatures ranging from about 24° C. to 30° C. and preferably about 25° C. The pressure of application may range from about 10 lbs/cm$^2$ to 50 lbs/cm$^2$ and preferably is about 25 lbs/cm$^2$.

The flexible substrate may comprise any number of polymeric films such as those derived from monomers including ethylene, propylene, butylene and, copolymers of these olefins; vinyl monomers such as vinyl acetate, vinyl chloride, vinylidene chloride, vinyl fluoride, acrylonitrile, methyl methacrylate and mixtures thereof; ethylene with portions of one or more unsaturated monomers such as vinyl acetate, acrylic acid and acrylic esters; as well as styrenes, carbonates, esters and urethanes. Generally the flexible substrate comprises an ethylene vinyl acetate, a polyvinyl chloride, or a polyolefin.

The adhesive strength of the adhesive film varies from about 50 gm/20 mm up to about 100 gm/20 mm. Commercially available adhesive films include V-8-S from Nitto Denko which is a polyvinyl chloride based tape having a 10 micron thick adhesive layer, a 70 micron thick polyvinyl chloride flexible substrate and 100 gm/20 mm of adhesion. Another film is the Nitto Denko V-8-T having the same composition as the V-8-S film with 50 gm/mm of adhesion.

Other useful films include Nitto Denko's BT-150E-EL film having 75 gm/20 mm of adhesion a base layer of ethylene vinyl acetate which holding a 15 micron adhesive layer; Lintec's Adwill P-1500 B film which is a water flushable tape having a base material of polyolefin which is 110 micron thick, and adhesive layer of polyacrylate which is 20 microns thick, an adhesive layer of polyacrylate which is 20 microns thick and has adhesion of 140 gm/25 mm.

Once in place, the adhesive film 18 may be trimmed to the frame 10 dimension. Fluid may then be dispensed at either one or both of the spaces 14 or 14', and allowed to flow to the other space. The fluid functions to fill the recesses 24 and 24' and then planarize the rows 22 and 22' on the carrier 12. This reduces, and can prevent, redeposition of materials etched from the rows 22 and 22' into the recesses.

Additionally, by bringing the level of fluid to substantially the same level as the elevated air bearing surface side of the rows 22 and 22' positioned on the carrier 12, a planar landscape is formed across the surface of the carrier 12. This allows for the use of thinner etch resists which, in turn, provides for creation of higher definition patterning.

Fluids useful in the invention are those which can be drawn into the recesses 24 and 24' between rows 22 and 22', hardened, and then later removed. Exemplary fluids include thermo-elastic organic materials such as fatty acids and waxes. One species of fluids which have been found useful include waxes such as insect waxes like beeswax; animal waxes such as lanolin; vegetable waxes including candellila, carnuba, japan wax, ouricury wax, pine wax, rice-bran wax, jojoba, castor wax, bayberry wax and mixtures thereof. Other useful waxes include mineral waxes such as montan wax, peat wax, ozckerite wax, ceresin wax and petrolatum. Also useful are synthetic waxes such as polyethylene waxes and chemically modified hydrocarbon waxes. Preferably, the wax or wax combination has a melting point ranging from about 60 to 120° C., and a density of about 0.9 to 1.1 gm/cm$^3$ at 23° C.

Preferably, the fluid is a heated wax such as Candellila wax. Candelilla wax may be used to fill the recesses 24 between the rows 22 prior to the ion milling process. Waxes in general have many desirable properties, such as low melt viscosity, low out-gassing in vacuum chamber, solventless application, solventless removal and easy cleaning. Candelilla wax has a melting point of 68° C. to 70° C. and a density of 0.95 to 0.99 gm/cc$^3$ at 23° C.

Candelilla wax has additional unique desirable properties such as hardness, and very low shrinkage upon solidifying. These properties are important for process ruggedness, and for proper and complete filling of recesses. Candelilla wax, allows for complete planarization of rows with very narrow spacing between rows 22. Furthermore, since it is easy to remove the wax after etching, the wax removal process can be incorporated into photoresist stripping and row cleaning processes.

In accordance with a further preferred aspect of the invention, the carrier 10 may be filled with fluid by tilting the assembly at an angle in relationship to a horizontal plane. A vacuum oven may also be used to minimize bubble formation. The use of a vacuum oven assists in reducing bubble formation in the recesses 24 between the rows 22. Generally during filling, fluid is dispensed at one end of the laminated carrier 12 and allowed to flow to the other end, FIG. 4. The fluid fills all recesses 24 between the rows 22, as well as the recesses 24' between the end rows 22' and the stainless steel posts 26, FIG. 4. With even fluid flow in all recesses, no bubbles are formed in the recesses when filling is complete.

However, since the widths of the recesses are often not uniform, the fluid will flow through certain recesses faster than others. For example, there is a difference in width between recesses 24 and 24'. Furthermore, particles may embed in narrower recesses and restrict the flow of the planarizing fluid. Uneven fluid flow, particle obstruction, and other problems may create bubble formation. In turn, the formation of bubbles may result in a lack of planar geography in the finished carrier.

Figure 5:
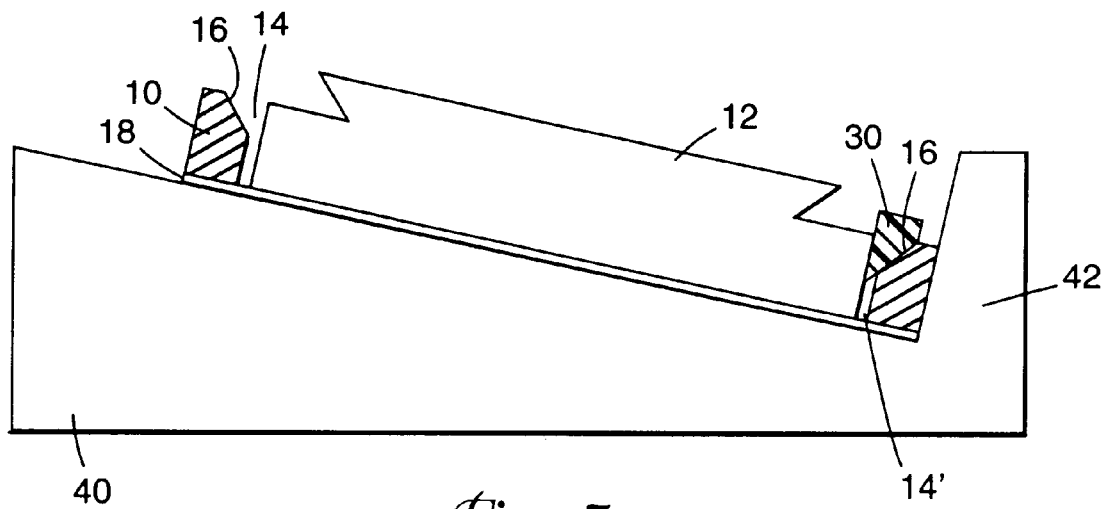
FIG. 5 is a side elevation depicting a carrier and frame prepared for processing in accordance with an alternative aspect of the invention.
Figure 6:
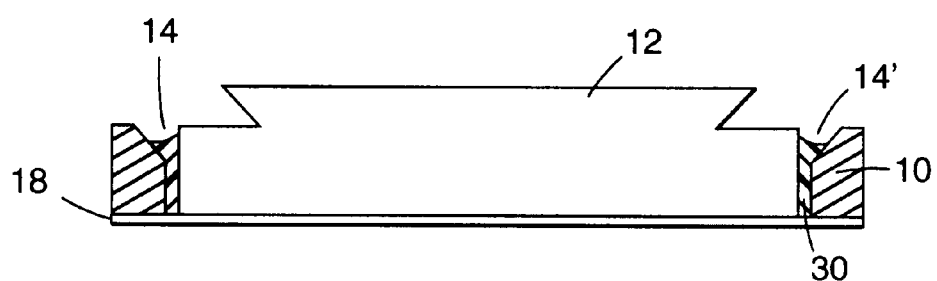
FIG. 6 is a side elevation depicting the carrier and have shown in FIG. 5 after processing.

For example, FIG. 5 shows a the laminated carrier 12 and frame 10 placed upside down on a hot plate 40 and wax 30 placed at space 14' between the row ends and frame 10. The hot plate 40 is preferably tilted to an angle of from about 10 degrees to 20 degrees preferably about 15 degrees. While not shown, the rows 22 and 22' and recesses 24 and 24' traverse up the incline and are perpendicular to the edge 42 of hot plate 40.

In this case, wax 30 is dispensed at the lower space 14' of the carrier. The assembly may then be placed in the vacuum chamber. The tilted hot plate 40 prevents back spilling and bubble trapping before the vacuum chamber is pumped down. The amount of wax used should be measured carefully to provide planarization and also prevent back spilling and bubble formation. Generally, when using a wax, the carrier 12 and frame 10 are chilled to a temperature which maintains the wax as a solid while the vacuum is applied. The chilling temperature will depend upon the melting point of the wax. The wax may be placed between the frame 10 and carrier 12 adjacent spaces 14 or 14'. The work piece may then be positioned in the oven, and placed under vacuum at an elevated temperature. Generally, the vacuum pressure ranges from about 1 to 0.1 psi.

The hot plate is then heated to a few degrees higher than the melting point of the wax, generally from about 5° C. to 10° C. above melting point. The wax flows and fills most of the recesses 24 and 24' between the rows 22 and 22'. After equilibrium the hot plate 40 may be leveled to assure the filling of the total length of the row. Subsequently, the filled structure is removed from the hot plate 40, FIG. 6, and allowed to cool on a cold plate, which solidifies the wax material. Once solidified, the frame 10 may be removed by reheating the assembly to a temperature slightly less than the melting temperature of the wax, (about 10° C.). Since no air is present before leveling, no air is trapped, and the filling of all recesses in complete.

After the filling, the filled material is solidified by cooling. The laminated carrier may be leveled by after processing by means such as mechanical or electrical remote mechanisms. Once solidified, the contiguous adhesive film may be removed and the assembly may be etch masked, the etch mask developed, and the ABS side of the slider patterned. Due to the planarization in the gaps between the row ends and the ring, the carrier is "extended" such that edge beads form only on the ring and not on the row. Consequently, ABS dimensional accuracy by the photo process is preserved, and the rest of the row surfaces are protected from particulate redeposition during etching.

The above specification, examples and data provide a complete description of the manufacture and the use of the many of the methods and compositions of the invention. Since many embodiments of the invention can be made without departing from the spirit and the scope of the invention, the invention resides in the claims hereinafter appended.

The claimed invention is:

1. A method of processing an assembly to prepare said assembly for etch patterning, said assembly comprising a row or bar mounted on a substrate, said row or bar bordered by a recess, said method comprising the steps of:
   (a) placing the assembly within a frame;
   (b) applying a contiguous adhesive film across said assembly and said frame;
   (c) depositing a fluid in said frame, said fluid forming in said recess; and
   (d) removing said contiguous adhesive film.

2. The method of claim 1, wherein said assembly substrate has an outer perimeter and said frame has an inner perimeter, said assembly substrate outer perimeter being smaller than said frame inner perimeter.

3. The method of claim 1, wherein said frame comprises a top and a bottom, and said contiguous adhesive film is applied across the entirety of said frame bottom.

4. The method of claim 1, wherein said assembly substrate comprises a top and a bottom, and said contiguous adhesive film is applied across said assembly substrate top.

5. The method of claim 4, wherein said row is positioned on said assembly substrate top.

6. The method of claim 5, wherein said contiguous adhesive film holds said fluid in said recess on said assembly substrate top.

7. The method of claim 1, wherein said contiguous adhesive film comprises a laminate of an adhesive layer and a flexible substrate layer.

8. The method of claim 7, wherein said adhesive layer is pressure sensitive.

9. The method of claim 8, wherein said pressure sensitive adhesive is selected from the group consisting of acrylics, natural rubbers, butyl rubbers, polyvinyl ethers, silicones and mixtures thereof.

10. The method of claim 1, wherein said fluid comprises a wax.

11. The method of claim 1, wherein said fluid is solidified before said film is removed.

12. The method of claim 11, wherein said fluid comprises candelilla wax.

13. The method of claim 1, wherein said assembly is held at an angle ranging from about 10° to 20°, relative to horizontal, during fluid deposition.

14. The method of claim 1, wherein said assembly comprises a first row and a second row, said first and second rows separated by said recess, said fluid deposited into said recess.

15. The method of claim 14, wherein said recess is filled with said fluid to the level of said first and second rows.

16. The method of claim 1, wherein said adhesive film comprises a photoresist.

17. The method of claim 1, wherein said fluid is drawn into said recess with pressure.

18. The method of claim 17, wherein said pressure ranges from about 1 psi to 0.1 psi.

19. The method of claim 1, further comprising the steps of:

(a) coating said row surface with an etch mask;

(b) developing said etch mask; and (c) etch patterning said row surface.

20. A method of preparing an air bearing surface of a slider for etch patterning, said method comprising the steps of:

(a) applying a first slider to a substrate, said first slider comprising an air bearing surface;

(b) applying a second slider to said substrate, said second slider comprising an air bearing surface, said first and second sliders separated by a recess, said first and second slider air bearing surfaces being exposed;

(c) placing said substrate into a frame;

(d) applying an adhesive film across said substrate and said frame, said adhesive film being contiguous across said frame and said substrate, said adhesive film positioned adjacent said exposed first and second air bearing surfaces;

(e) depositing a heated fluid in said frame, said fluid forming in said recess, said fluid comprising candellila wax;

(f) cooling said candellila wax; and (g) removing said contiguous adhesive film.

21. The method of claim 20, wherein said substrate has an outer perimeter and said frame has an inner perimeter, said substrate outer perimeter being smaller than said frame inner perimeter.

22. The method of claim 20, wherein said frame comprises a top and a bottom, and said contiguous adhesive film is applied across the entirety of said frame bottom.

23. The method of claim 20, wherein said contiguous adhesive film comprises a laminate of an adhesive layer and a flexible substrate layer.

24. The method of claim 23, wherein said adhesive layer is pressure sensitive.

25. The method of claim 20, wherein said pressure sensitive adhesive is selected from the group consisting of acrylics, natural rubbers, butyl rubbers, polyvinyl ethers, silicones and mixtures thereof.

26. The method of claim 20, wherein said contiguous adhesive layer comprises a photoresist.

27. The method of claim 20, wherein said recess is filled with said fluid to the level of said first and second sliders.

28. The method of claim 22, further comprising the steps of:

(a) coating said first and second slider air bearing surface with an etch mask;

(b) developing said etch mask; and c) patterning said first and second slider air bearing surface.

* * * * *

UNITED STATES PATENT AND TRADEMARK OFFICE
CERTIFICATE OF CORRECTION

PATENT NO.   : 6,106,736
DATED        : August 22, 2000
INVENTOR(S)  : LeVan et al.

It is certified that error appears in the above-identified patent and that said Letters Patent is hereby corrected as shown below:

<u>Column 10,</u>
Line 28, replace "22" with -- 20 --.

Signed and Sealed this

Twenty-first Day of January, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,106,736
DATED         : August 22, 2000
INVENTOR(S)   : LeVan et al.

It is certified that error appears in the above-identified patent and that said Letters Patent is hereby corrected as shown below:

Column 4,
Line 16, replace "row" with -- rows --.

Column 7,
Line 37, delete "the".

Column 8,
Line 22, delete "of the" after "many".

Column 10,
Line 28, replace "22" with -- 20 --.

This certificate supersedes Certificate of Correction issued January 21, 2003.

Signed and Sealed this

Twenty-eighth Day of January, 2003

JAMES E. ROGAN
*Director of the United States Patent and Trademark Office*